(12) United States Patent
Kunisawa et al.

(10) Patent No.: US 6,547,331 B2
(45) Date of Patent: Apr. 15, 2003

(54) ARRANGEMENT FOR SECURING LONG SLIDE RAIL DEVICE TO VEHICLE

(75) Inventors: Atsushi Kunisawa, Akishima (JP); Takanori Ishizuka, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 09/843,793

(22) Filed: Apr. 30, 2001

(65) Prior Publication Data

US 2002/0003369 A1 Jan. 10, 2002

(51) Int. Cl.⁷ ............................... A47C 1/06; B60N 2/02
(52) U.S. Cl. ................... 297/344.1; 297/378.1
(58) Field of Search .................... 297/344.1, 378.1; 296/65.13, 65.14; 248/430, 431

(56) References Cited

U.S. PATENT DOCUMENTS

| | | | | |
|---|---|---|---|---|
| 4,691,946 A | * | 9/1987 | Sburlati et al. | ............ 248/393 |
| 5,280,987 A | * | 1/1994 | Miller | ........................ 248/429 |
| 5,364,152 A | * | 11/1994 | Mastrangelo et al. | .... 296/65.03 |
| 5,711,505 A | | 1/1998 | Nemoto | |
| 5,785,292 A | | 7/1998 | Muraishi et al. | |
| 5,800,015 A | | 9/1998 | Tsuchiya et al. | |
| 5,961,088 A | * | 10/1999 | Chabanne et al. | .......... 248/429 |
| 6,059,345 A | * | 5/2000 | Yokota | ....................... 248/430 |
| 6,293,622 B1 | * | 9/2001 | Horisawa | ..................... 248/429 |

* cited by examiner

Primary Examiner—Peter M. Cuomo
Assistant Examiner—Sarah C. Burnham
(74) Attorney, Agent, or Firm—Browdy and Neimark

(57) ABSTRACT

Arrangement for securing a long slide rail device with support legs in a vehicle floor, the long slide rail device including a long lower rail, wherein, among the support legs, a leg member is provided at a vulnerable point of the long lower rail which is defined between a seat storage area and a seat home position area in a vehicle or automobile, so that a part of great force applied from a vehicle seat will be escaped through the leg member to the vehicle floor, thereby preventing undesired bending or deformation of the long lower rail at that vulnerable point.

9 Claims, 3 Drawing Sheets

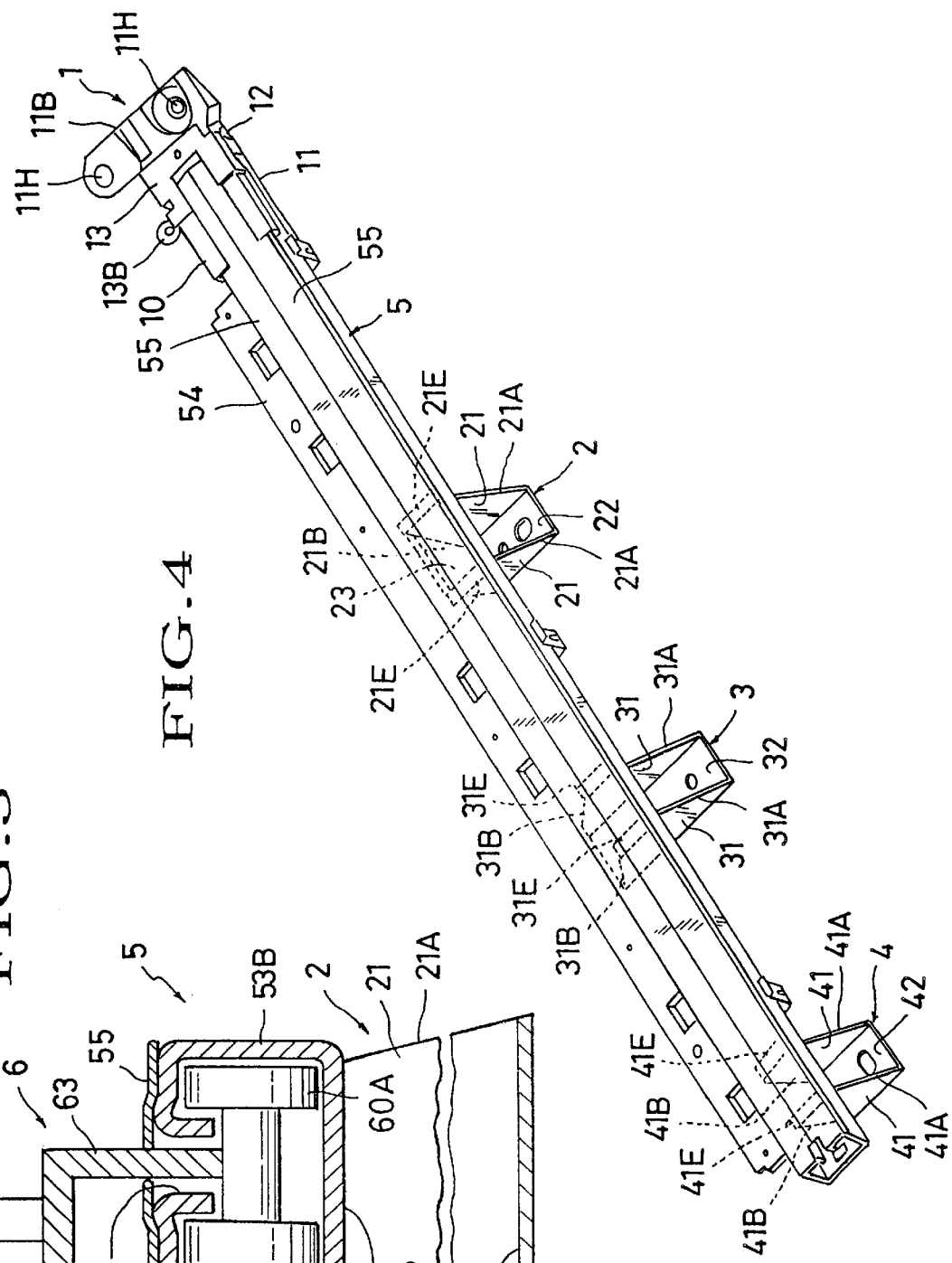

ARRANGEMENT FOR SECURING LONG SLIDE RAIL DEVICE TO VEHICLE

BACKGROUND OF INVENTION

1. Field of the Invention

The present invention relates to a long slide rail device on which a vehicle seat is mounted for fore-and-aft movement therealong. Particularly, the invention is directed to an arrangement for securing the long slide rail device to the floor of vehicle or automobile.

2. Description of Prior Art

A conventional long slide rail device is normally utilized in a relatively large vehicle, such as a van-type vehicle, in which a second or third rear seats are movable towards a front seat to widen the rearward area of the vehicle cabin to provide a load-carrying platform behind the front seat. According to the long slide rail device, a pair of long slide rails are securely attached on the floor of vehicle or automobile, allowing the second and/or third rear seats to be slidingly moved therealong to attain a wide space in the rearward area of cabin. Typically, in the case of a vehicle or automobile of this kind with a second rear seat for instance, the long slide rail has the following two areas defined therein: a seat home position area (see the designation (B) in FIG. 1) wherein the second seat is normally positioned a certain distance from a front seat so that a passenger can climb and sit thereon, and a seat storage area (see the designation (A) in FIG. 1) where the second seat is stored in a folded-down state behind the front seat, thereby providing a wide space or load-carrying platform in the rearward area of vehicle cabin. The long side rail itself comprises a lower rail fixed on the floor of the vehicle and an upper rail slidably fitted in the lower rail. The second seat and/or third seat, for instance, are/is fixedly attached on the upper rail and may be provided with a seat belt for restraining a passenger to the seat.

In most cases, the long slide rail is firmly secured in a recessed groove formed in the floor to avoid projection from the surface of floor, the recessed groove being normally of a dimensions generally same width or slightly larger than those of lower rail of the long slide rail. Specifically, in this conventional structure, the slide rail has a plurality of horizontal extending securing lugs formed in the lower rail thereof, which extend horizontally and symmetrically from the upper surface of the lower rail. By fastening those securing lugs to the adjacent surface areas of floor, the slide rail per se is firmly secured in the groove. But, there are some cases that such groove has a depth greater than or about twice the height-wise thickness of a lower rail of the long slide rail and then a support leg must be provided to compensate for that height-wise difference in size between the lower rail and groove. In other words, the support leg must be provided between the lower rail and the bottom of the groove in order to place the upper side of the lower rail in registry with the upper surface of floor, which is realized for instance by welding the support leg to the bottom side of the lower rail and firmly attaching the leg to the bottom of the groove. In this sort of long slide rail, a pair of forward and rearward support legs are provided in the lower rail thereof to support the whole length of the slide rail. However, such provision of two support legs has the problem that an intermediate portion of long slide rail between the two support legs is prone to downward bending due to a great load being applied thereto from the seat.

The prior art is known to teach an additional support member between forward and rearward support legs below a slide rail in an attempt to prevent a lower rail of the slide rail against downward bending due to a great force being applied thereto in a direction rearwardly of the seat.

However, such arrangement has not been applied to a long slide rail in the past. In particular, as stated above, a seat home position area is defined in the rearward region of the long slide rail whereas a seat storage area defined in the forward region thereof, so that a rear seat, be it a second or third seat, can be positioned or stored as required. Further, in the case where the rear seat is provided with a seat belt for restraining a passenger thereto and such rear seat is set in the seat positioning area, a great force will be applied through the seat belt to a point forwardly of the seat home position area in a collision case or the like, resulting in a downward bending of the long slide rail at that particular point. In other words, a deformation will occur at the side of the seat storage area in the long slide rail.

SUMMARY OF THE INVENTION

In view of the above-stated drawbacks, it is a primary purpose of the present invention to provide an improved arrangement for securing a long slide rail device to a vehicle.

In order to achieve such purpose, in accordance with the present invention, there is basically provided an arrangement for securing a long slide rail device to a floor of vehicle having a groove formed therein, in combination with a vehicle seat, the floor of vehicle including, defined therein, a seat storage area where the vehicle seat is to be stored to widen a space in the floor of vehicle and a seat home position area where the vehicle seat is to be set to enable a passenger to sit thereon,

- wherein the long slide rail device includes a long lower rail means fixed at the floor of vehicle, which long lower rail means has a forward region corresponding to the seat storage area and a rearward region corresponding to the seat home position area;
- wherein the long slide rail device includes an upper rail means slidably fitted in the long lower rail means, which upper rail means is to be fixed at the vehicle seat to allow movement of the vehicle seat along the long lower rail means in a direction between the seat storage and home position areas;
- wherein at least two support leg means are each fixedly provided at the forward and rearward regions of the lower rail means, respectively, while being both firmly attached in the groove; and
- wherein another leg means is fixedly provided at a point in the long lower rail means between the at least two support leg means such as to be disposed in the groove.

Accordingly, the above-noted point in the lower rail means is prevented against deformation when a great force is caused from the vehicle seat, attempting to draw upwardly the rearward region of the long lower rail means.

In one aspect of the invention, the foregoing another leg means is large in width-wise length relative to the at least two support leg means and of a generally trapezoidal shape small in height-wise length relative to the at least two support leg means, having a bottom wall large in area relative to the bottom walls of the latter.

Another various features and advantages of the present invention will become apparent from reading of the descriptions hereinafter with reference to the annexed drawings.

BRIEF DESCRIPTION OF THE DRAWINGS

FIG. 1 is a diagram showing arrangement for securing a long slide rail device in a groove of vehicle floor in accordance with the present invention;

FIG. 3 is a sectional view taken along the line III—III in FIG. 2;

FIG. 4 is a perspective view of the long slide rail unit with an upper rail removed therefrom;

DETAILED DESCRIPTION OF PREFERRED EMBODIMENT OF THE INVENTION

FIGS. 1 through 6 illustrate one preferred mode of an arrangement for securing a long slide rail device to the floor of vehicle or automobile in accordance with the present invention.

Figure 1:
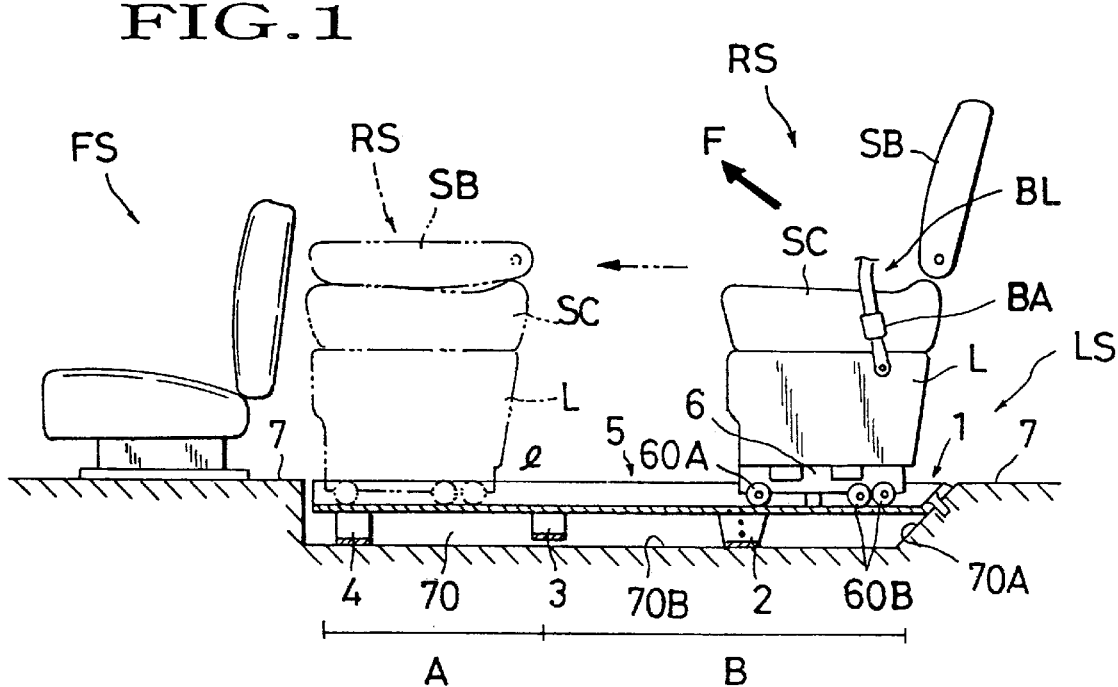

According to the illustrated mode, in particular referring to FIG. 1, there is shown a cabin of a vehicle of van type or the like, in which a front seat (FS) is fixed on the floor (7) and a rear seat (RS) is movably secured on a long slide rail device which is firmly attached in a long rectilinear groove (70) formed in the floor (7). Although the long slide rail device is shown as having only one slide rail unit (LS), it is to be understood that a pair of slide rail units (LS) are provided under the rear seat (RS) as with ordinary seat slide rail arrangements, and therefore, a pair of grooves (70) are formed in the floor (7) to receive those two slide rail units (5) therein. For simplicity, a description will be made only of one long slide rail unit (LS) and one groove (7).

Figure 2:
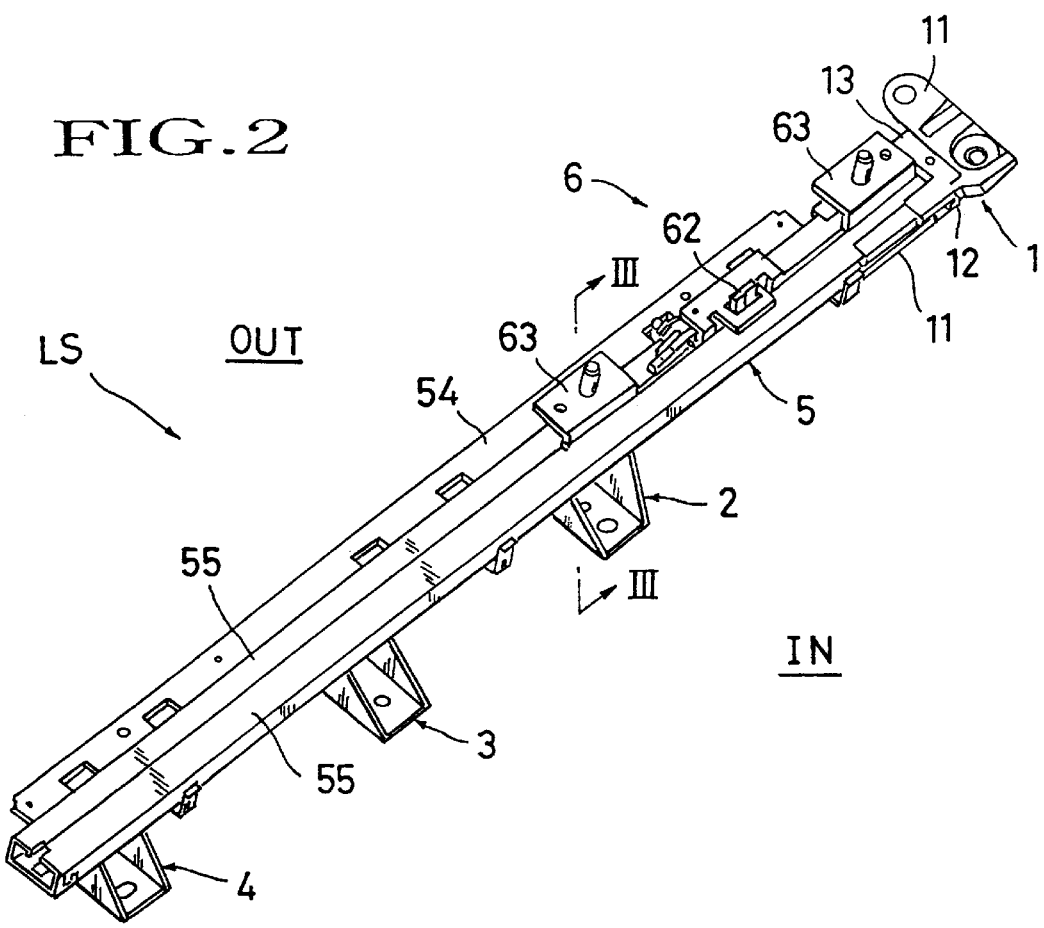
FIG. 2 is a perspective view of one long slide rail unit.

The long slide rail unit (LS) is of a typically known structure consisting essentially of a long lower rail (5) and a relatively short upper rail (6) slidably fitted in the lower rail (5). As seen in FIGS. 1 to 3, the long lower rail (5) is of a generally "U" shape in cross-section with an elongated guide slit (52) defined in the upper side thereof, having a bottom wall (51) and a pair of lateral walls (53A)(53B). On the other hand, as best shown in FIGS. 1 and 2, the upper rail (6) includes, defined integrally therein, a pair of spaced-apart connecting portions (63)(63); a locking mechanism (62); forward roller (60A) and a pair of rearward rollers (60B). As can be seen from FIG. 3, the upper rail (6) is slidably fitted via the elongated slit (52) of lower rail (5), with the rollers (60A, 60B) thereof being rotatably accommodated within the lower rail (5). Though not shown, the lower tail (5) has a plurality of lock holes formed in the bottom wall (51) and the locking mechanism (6) includes a lock plate that can be brought to engagement in and from one of the lock holes such that the upper rail (6) may be locked and unlocked with respect to the lower rail (5) to adjustably locate the rear seat (RS) in the fore-and-aft direction of the vehicle. Designation (55) denotes split rubber plates adapted to elastically close the elongated slit (52) of lower rail (5) and also elastically sandwich the vertical portion of upper rail (6) against invasion of dusts and foreign materials into the inside of lower rail (5). Designation (54) denotes a synthetic resin plate firmly attached to and along the lateral wall (53A), to which a carpet (not shown) may be anchored.

Turning back to FIG. 1, in the shown vehicle cabin, there is a rearward space behind the front seat (FS) where there lies the floor (7) and the foregoing long slide rail unit (5) as is normally known in the art. In general, the rear seat (RS) is slidingly movable on the floor (7) via the long slide rail unit (5) in the fore-and-aft direction to and from the front seat (FS). As shown, the rear seat (RS) is fixedly mounted on the upper rail (6) of slide rail unit (5). In the illustrated mode, the rear seat (RS) is formed by a seat cushion (SC); seat back (SB) and support base member (L). The seat cushion (SC) is fixed on the support base member (L). The seat back (SB) is so attached to the seat cushion (SC) as to be foldable down forwardly relative thereto as indicated by the two-dot chain line in FIG. 1. The support base member (L) is fixed at its bottom upon the two securing portions (63)(63) of the upper rail (6). A seat belt anchor (BA) is firmly attached to the support base member (L) and a seat belt (BL) is releasably connected with that anchor (BA) at the buckle (not shown) thereof in order that a passenger may be restrained thereby to the rear seat (RS). The seat belt anchor (BA) may however be attached to the seat cushion (SC) instead of to the base member (L).

As can be seen from FIG. 1, the rearward cabin space behind the front seat (FS), there are defined a seat storage area (A) and a seat home position area (B). As indicated by the solid lines, the rear seat (RS) is positioned or may be adjustably positioned via the locking mechanism (62) of the slide unit (5) within the seat home position area (B), allowing a passenger to be seated with his or her preferred posture in the rear seat. On the other hand, as indicated by the two-dot chain lines, the rear seat (RS) may be moved forwardly toward the front seat (FS) and stored in the seat storage area (A) with the seat back (SB) thereof folded down onto the seat cushion (SC) thereof, whereby a wide space is attainable in the rearward cabin region, which may be used as a load-carrying platform or for other purposes.

FIG. 1 shows the long slide rail unit (5) as being secured in the long groove (70), from which it is observed that the groove (70) is formed in the floor (7) in a relatively great depth, which is about twice the height-wise thickness of the lower rail (5) of the slide rail unit (5). In this particular instance, as discussed in the description of prior art, the long slide rail unit (LS) has a point prone to downward bending due to a great force being applied thereto from the rear seat (RS). Namely, with reference to FIG. 1 again, now let it be assumed that the rear seat (RS) is set in the normal seat position area (B) and a passenger sits on the rear seat (RS) with his or her body being restrained thereto by the seat belt (BL). If a collision occurs for instance, a great forward force as indicated by the arrow (F) is caused from the passenger, attempting to strongly pull the whole of rear seat (RS) from the floor (7) via the seat belt (BL). Simultaneous therewith, a corresponding great force is applied to the rearward portion of the long slide rail unit (LS) where the seat (RS) overlies, which substantially corresponds to the seat home position area (B). At this moment, such rearward potion of long slide rail unit (LS) is about the be bent upwardly, or strictly stated, the rearward region of the lower rail (5) is about to be bent upwardly with respect to a point (l) between the seat storage area (A) and seat home position area (B). It thus follows that such point (l) is very prone to downward bending due to the intensive application of the force (F) thereto.

With the foregoing vulnerable point in view, according to the illustrated embodiment of the present invention, a novel arrangement is made in both of the long slide rail unit (LS) and groove (70) in order to prevent the downward bending of the lower rail (5) at that point (l) Specifically, as best shown in FIGS. 1 and 4, four support legs (1, 2, 3 and 4) are fixedly attached to the bottom wall (51) of the lower rail (5) with such an arrangement that a forward support leg (4) is disposed generally at the foremost end portion of the lower rail (5) in the seat storage area (A), a rearward support leg (2) disposed at point near to the rearmost end of the lower rail (5) within the seat home position area (B), as known in the art, whereas in addition thereto, an intermediate leg member (3) is disposed at the above-stated point (l) in the lower rail (5) between the seat storage and home position areas (A)(B), and a rearmost support leg (1) is firmly connected with the rearmost end part of the lower rail (5).

Figure 5:
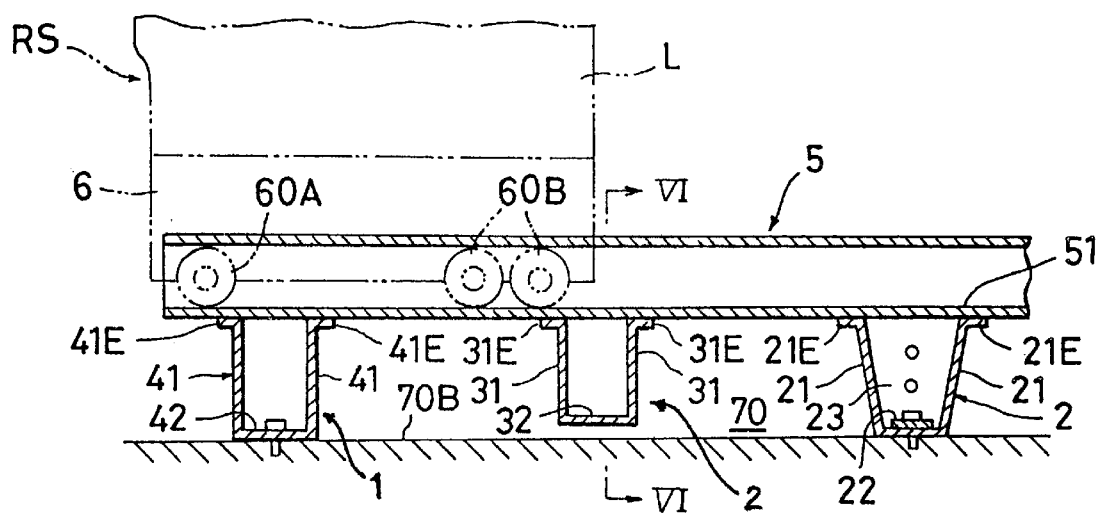
FIG. 5 is a fragmentary longitudinal sectional view of a lower rail of the long slide rail unit.

The forward and rearward support legs (4)(2) each assumes a generally quandrangular configuration with one slant side as viewed from FIGS. 3 and 4. Also, both forward and rearward support legs (4)(2) are of a generally channel configuration as viewed from the longitudinal section in FIG. 5. Specifically stated, the forward support leg (4) comprises a flat bottom wall (42) and a pair of spaced-apart vertical walls (41)(41) erecting integrally from the bottom wall (42), wherein the two vertical walls (41) each has a slant side edge (451A) and a straight vertical side edge (41B). Likewise, the rearward support leg (2) comprises a flat bottom wall (22) and a pair of spaced-apart vertical walls (21)(21) each having one slant side edge (21A). As best seen in FIG. 5, the forward and rearward support legs (4)(2) are welded firmly to the bottom wall (51) of lower rail (5) at their respective two horizontal connecting end portions (41E) and (21E) such as to be dependent from the lower rail (5). As in FIG. 3, the rearward support leg (2) is further formed with a reinforcing wall portion (23) integrally between the straight side edges (21B) thereof. Those two support legs (2)(4) fixed to the lower rail (5) are in turn at their respective bottom walls (22)(42) firmly attached on the bottom (70B) of the groove (70) as by fastening bolts, thereby providing a basic supportive fixation to the long slide rail unit (LS). It is noted here that, as can be seen in FIGS. 2 and 4, the straight side edges (41B)(21B) respectively of the forward and rearward support legs (4)(2) face towards an outer side (OUT) near to a door of vehicle, whereas on the other hand, the slant side edges (41A)(41B) respectively of those two legs (4)(2) face towards an inner side (IN) inwardly of the slide rail unit (LS) or the rear seat (RS).

In addition thereto, provided in the slide rail unit (LS) are the intermediate leg member (3) and rearmost support leg (1) in the shown embodiment. As previously noted, there is a vulnerable point (l) potentially found in the lower rail (5), and therefore, in accordance with the present invention, the intermediate leg member (3) is fixed to that point (l) to effectively prevent downward bending of the lower rail (5) relative thereto due to an impact from the great force (F). As best shown and viewed from FIG. 6, the intermediate leg member (3) itself assumes a generally trapezoidal configuration which diverges in the downward direction and also is of a generally channel shape in the longitudinally sectional view of FIG. 5. Specifically, the intermediate leg member (3) comprises a flat bottom wall (32) and a pair of spaced-apart vertical walls (31)(31) each erecting integrally from the bottom wall (32) and terminating in a horizontal connecting end portion (31E), wherein the two vertical walls (31) each has two sloped side edges (31A)(31B) that diverge in a direction from the end portion (31E) down to the bottom wall (32). Hence, as can be seen from FIGS. 4 and 6, the bottom wall (32) of intermediate leg (3) is increased in both area and width-wise length relative to other support legs (4)(2). As in FIGS. 5 and 6, the intermediate leg member (3) is fixedly attached at its two connecting end portions (31E) to the bottom wall (51) of lower rail (5) in such a manner that the bottom wall (32) thereof is spaced from and disposed adjacent to the bottom of groove (70). In other words, according to the present invention, the intermediate leg member (3) is comparatively small in height-wise length relative to other support legs (4)(2) and in the state of being floated at a small distance from the groove bottom (70B), thus being out of contact therewith, in contrast to the forward and rearward support legs (4)(2) directly attached on the groove bottom (70B).

The rearmost support leg (1) is depicted in FIG. 4 as comprising an upper securing bracket portion (10), a lower connecting bracket portion (11) and a reinforcing member (13). The upper securing bracket portion (10) is of generally "U" shape having an opened area in which the rear end region of the lower rail elongated slit (52) is accessible for allowing the upper rail (5) to be slid thereinto. The lower connecting bracket portion (11) has a longitudinal body for receiving the rear end portion of lower rail (5) thereon and an upwardly inclined securing section (11B) adapted for fixation to the sloped rearward end region (70A) of groove (70), in which securing section (11B), two securing holes (11H)(11H) are formed. Those two bracket portions (10)(11) are securely jointed together at a connecting part (12) as by bolts such as to embracingly and fixedly connect the support leg (1) per se with the rear end portion of the lower rail (5). Fixedly provided between the two brackets portions (10)(11) is a reinforcing member (13) which has a securing lug (13B) adapted for fixation to the sloped rearward groove end region (70A).

As viewed from FIG. 1, such sloped rearward groove end region (70A) is formed in the right end side of the long rectilinear groove (70) at the seat home position area (B).

With the above-described arrangements, firm attachment of the long slide rail unit (LS) in the long groove (70) is by fastening the forward and rearward support legs (4)(2) to the flat bottom (70B) of groove (70) and also fastening the securing portions (11B, 13B) of rearmost support leg (1) to the rearward sloped bottom (70A) of rearward groove end region (71), as understandable from FIGS. 1 and 5. Hence, only the intermediate leg member (3) is in the state of being floated a small distance above the groove bottom (70B).

Figure 6:
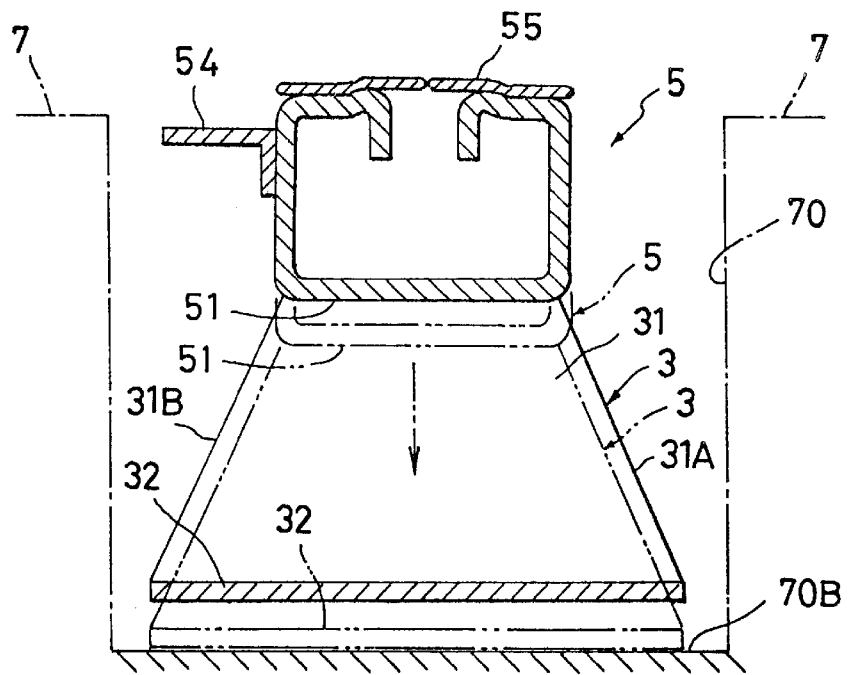
FIG. 6 is a sectional view taken along the line VI—VI in FIG. 5, showing how an intermediate leg member is lowered to contact with a bottom of the groove.

In accordance with the present invention, therefore, when the great load (F) is caused from the rear seat (RS) located at the seat home position area (B), a very slight downward bending of lower rail (5) (a minute degree to which it is recoverable into its normal rectilinear state) brings the intermediate leg member (3) immediately into contact with the groove bottom (70B) as indicated by the two-dot chain lines in FIG. 6, whereupon an intensive downward force which is about to intensively exert on the vulnerable point (l), is quickly transmitted to the intermediate leg member (3) and diverged in the downward divergent configuration of the leg member (32) and its wide bottom wall (32). Finally, the force escapes at once therethrough to the floor (7). Thus, the forward region of long lower rail (5) generally corresponding to the point (l) is positively prevented against downward bending or deformation.

Further, the fact that the intermediate leg member (3) is comparatively small in height-wise length relative to other support legs. (4)(1) indeed allows for installing the long slide rail unit (LS) in the groove (70) in place even if the lower rail (5) or the groove bottom (70B) happens to be formed a little irregularly height-wise thereof. Of course, it is important that such height-wise size of intermediate leg member (3) be so small relative to that of the two legs (4)(1) in reference to the groove bottom (70B) that, when a downward great load is applied to the corresponding point (l) of lower rail (5), the bottom wall (32) of intermediate leg member (3) is immediately brought to contact with the groove bottom (70B) without any downward bending or deformation occurring in the portion of lower rail (5) at and adjacent to that point (l).

While having described so far, it should be understood that the present invention is not limited to the illustrated embodiment, but any other modifications, replacements and additions may be structurally applied thereto without departing from the scopes of the appended claims.

What is claimed is:

1. In combination with a vehicle seat having a floor which includes a seat storage area allowing the vehicle seat to be stored therein to widen a space in the floor and a seat home position area allowing the vehicle seat to be set therein to enable a passenger to sit on the vehicle seat, an arrangement for securing a long slide rail device to said floor, wherein said long slide rail device includes a long lower rail means having a forward region corresponding to said seat storage area and a rearward region corresponding to said seat home position area;

wherein said long slide device includes an upper rail means slidably fitted in said long lower rail means, said upper rail means being fixed to said vehicle seat to allow movement of the vehicle seat along the long lower rail means in a direction between said seat storage area and home position area;

wherein a first support leg means is fixed to said long lower rail means at said forward region and extends downwardly therefrom, terminating in an end firmly attached to said floor;

wherein a second support leg means is fixed to said long lower rail means at said rearward region and extends downwardly therefrom, terminating in an end firmly attached to said floor;

wherein a third support leg means is fixed to said long lower rail at a point between said first support leg means and said second support leg means, said third support leg means extending downwardly from the long lower rail to a level adjacent to and apart from said floor; and wherein said long lower rail means is fixed by said first and second leg means to said floor in such a manner as to extend above the floor in parallel relation therewith.

2. The arrangement as defined in claim 1, wherein said vehicle seat is provided with a seat belt for restraining an occupant to the vehicle seat.

3. The arrangement as defined in claim 1, wherein said third support leg means has a width-wise length greater than that of said first and second support leg means.

4. The arrangement as defined in claim 1, wherein said third support leg means is of a generally trapezoidal shape and has a height-wise length smaller than that of said first and second leg means and an area of a bottom wall thereof larger than that of said ends respectively of said first and second support leg means.

5. In combination with a vehicle seat having a floor which includes a seat storage area allowing the vehicle seat to be stored therein to widen a space in the floor and a seat home position area allowing the vehicle seat to be sit therein to enable a passenger to sit on the vehicle seat, wherein at least one groove is so formed in said floor as to extend in a rectilinear manner along a direction between said storage area and home position area, said groove having a bottom, an arrangement for securing a long slide rail device to said floor, wherein said long slide rail device includes a long lower rail means having a forward region corresponding to said seat storage area and a rearward region corresponding to said seat home position area;

wherein said long slide device includes an upper rail means slidably fitted in said long lower rail means, said upper rail means being fixed to said vehicle seat to allow movement of the vehicle seat along the lower rail means in a direction between said seat storage area and home position area;

wherein a first support leg means is fixed to said long lower rail means at said forward region and extends downwardly therefrom terminating in an end firmly attached to said floor;

wherein a second support leg means is fixed to said long lower rail means at said rearward region and extends downwardly therefrom terminating in an end firmly attached to said floor;

wherein a third support leg means is fixed to said long lower rail at a point between said first support leg means and said second support leg means, said third support leg means extending downwardly from the long lower rail to a level adjacent to and apart from said floor;

wherein said first, second and third support leg means extend downwardly in said at least one groove in such a manner that the first and second support leg means are at their respective ends firmly attached on said bottom, while the third support leg means is disposed apart from and adjacent to said bottom; and wherein said long lower rail means is fixedly connected via said first and second leg means to said bottom associated with said groove, such that the long lower rail means extends in and along the groove in parallel relation with said bottom.

6. The arrangement as defined in claim 5, wherein said groove includes a rearward sloped end region defined at a point corresponding to said rearward region associated with said lower rail means, wherein said arrangement further includes a rearmost support leg means fixedly attached to said rearward sloped end region within said seat home position area.

7. The arrangement as defined in claim 5, wherein said vehicle seat is provided with a seat belt for restraining an occupant to the vehicle seat.

8. The arrangement as defined in claim 5, wherein said third support leg means has a width-wise length larger than that of said first and second support leg means.

9. The arrangement as defined in claim 5, wherein said third support leg means is of a generally trapezoidal shape and has a height-wise length smaller than that of said first and second leg means, and an area of a bottom wall larger than that of said ends respectively of said first and second support leg means.

* * * * *